United States Patent [19]

Edwards

[11] 4,380,912
[45] Apr. 26, 1983

[54] DOUBLE WALL TUBE ASSEMBLY FOR USE IN HEAT EXCHANGERS

[75] Inventor: Ray C. Edwards, Kinnelon, N.J.

[73] Assignee: Edwards Engineering Corp., Pompton Plains, N.J.

[21] Appl. No.: 264,860

[22] Filed: May 18, 1981

Related U.S. Application Data

[63] Continuation of Ser. No. 17,243, Mar. 5, 1979, abandoned.

[51] Int. Cl.³ .......................... F25B 39/04; F25D 7/10
[52] U.S. Cl. ...................................... 62/506; 165/154; 165/156
[58] Field of Search ....................... 165/163, 164, 156; 62/506

[56] References Cited

U.S. PATENT DOCUMENTS

| 1,882,120 | 10/1932 | Clifford | 62/399 |
|---|---|---|---|
| 2,000,906 | 5/1935 | Turner | 165/180 |
| 2,621,903 | 12/1952 | Cohler | 165/164 |
| 2,650,801 | 9/1953 | Collitu | 165/172 |
| 2,970,812 | 2/1961 | Kritzer | 165/163 |
| 2,998,228 | 8/1961 | Huet | 165/172 X |
| 3,612,175 | 10/1971 | Ford | 165/179 |
| 3,739,842 | 6/1973 | Whalen | 62/399 X |

FOREIGN PATENT DOCUMENTS

| 15455 | of 1900 | United Kingdom | 165/163 |
|---|---|---|---|
| 829103 | 2/1960 | United Kingdom . | |
| 1012898 | 12/1965 | United Kingdom . | |
| 1239194 | 7/1971 | United Kingdom . | |
| 1484596 | 9/1977 | United Kingdom . | |

*Primary Examiner*—William R. Cline
*Assistant Examiner*—Theophil W. Streule, Jr.
*Attorney, Agent, or Firm*—Daniel H. Bobis

[57] ABSTRACT

Double walled tube assemblies to meet local code requirements for heat exchangers passing potable water therethrough in non-contacting heat exchange relation for example refrigerant to liquid heat exchangers for reclaiming heat from refrigeration cycles and systems have a first or outer tubular member for passing a first fluid such as hot compressed refrigerant gas therethrough and a second or inner tubular member connected for operative relation to the first tubular member for passing the potable water to be heated therethrough. The second or inner tubular member shaped, sized, and connected to the first or outer tubular member to establish optimum heat exchange relation between the first tubular member and the second tubular member when formed into heat exchange units.

4 Claims, 7 Drawing Figures

DOUBLE WALL TUBE ASSEMBLY FOR USE IN HEAT EXCHANGERS

This is a continuation of application Ser. No. 17,243, filed Mar. 5, 1979, now abandoned.

BACKGROUND OF THE INVENTION

This invention relates generally to non-contacting heat exchangers and more particularly to a double wall tube assembly which defines fluid flow passages for non-contacting heat exchangers to meet local code requirements for preventing contamination of at least one of the fluids in the fluid flow passages such as potable water.

The present invention is particularly applicable for energy conservation wherein waste heat is recovered or reclaimed from refrigerant circuits or systems.

It is well known to put a desuperheater i.e., a noncontacting heat exchanger in the hot gas discharge line from the discharge outlet for the compressor in a refrigeration circuit or system in order to recover the waste heat from the hot compressed refrigerant gases discharged by the compressor.

Heretofore prior art desuperheaters included, tube assemblies consisting of two parallel flow passages in which potable water was passed through one passage and hot compressed refrigerant gas was passed through the other passage to permit the potable water to reclaim or recover the waste heat from the hot compressed refrigerant gas.

Such prior art tube assemblies consisted of two concentric tubes generally termed tube within a tube assemblies so that only a single heat conducting wall existed between the parallel flow passages. If this single wall failed the respective fluids passing through the parallel flow passages would contaminate each other. This was particularly important in the case where potable water was one of the fluids passing through the parallel flow passages.

Accordingly, the National Bureau of Standards and the Department of Housing and Urban Development have now established federal regulations which require double walls in heat exchange equipment where potable water is one of the fluids passing in heat exchange relation with hot compressed refrigerant gases for recovering or reclaiming heat therefrom.

These regulations have been adopted in local codes throughout the United States.

These regulations and codes respecting potable water pose difficulties on heat exchanger efficiency and characteristics because they require a departure from the known tube within a tube assemblies in that the thickness of the conductive walls of the tube assemblies is now doubled and the presence of air or other materials between the respective walls for such double wall tube assemblies as is known to those skilled in the art decreases heat exchange efficiency.

The present invention provides an improved double wall tube assembly in accordance with the requirements of the new regulations which can meet the local codes now imposed on refrigerant to liquid heat exchangers by shaping and sizing at least one of the tubes to permit intimate operative connection on at least two sides of such tube with an adjacent tube or tubes so that optimum heat exchange relation and efficiency is established for the heat exchanger when used as a desuperheater in such refrigerant circuits or systems.

SUMMARY OF THE INVENTION

Thus the present invention covers a double wall tube assembly for use in heat exchangers including, a first tubular member defining a first flow passage, at least one other tubular member defining a second flow passage, said other tubular member having a shaped and contoured outer surface to permit said other tubular member to maintain operative contact with said first tubular member in assembled position, and said other tubular member having a shaped and contoured inner passage to increase the heat exchange efficiency of said double wall tube assembly.

Additionally, the present invention covers an improved heat exchanger including at least one double wall tube assembly as above described.

Accordingly, it is an object of the present invention to provide a double wall tube assembly for refrigerant to liquid heat exchangers adapted to meet federal regulations and local codes.

It is another object of the present invention to provide heat exchangers including, at least one double wall tube assembly for use in refrigerant circuits and systems to reclaim or recover waste heat from the hot compressed refrigerant gases therein.

It is another object of the present invention to provide a double wall tube assembly for heat exchangers wherein at least one of the flow passages is contoured externally for intimate contact between the double walled tubes and internally contoured to optimize flow therethrough to increase the heat exchange efficiency of the heat exchangers in which such double wall tube assemblies are utilized.

With these and other objects in view the invention may best be understood from consideration of the following detailed description of the preferred embodiment in association with the drawings as follows.

Figure 1:
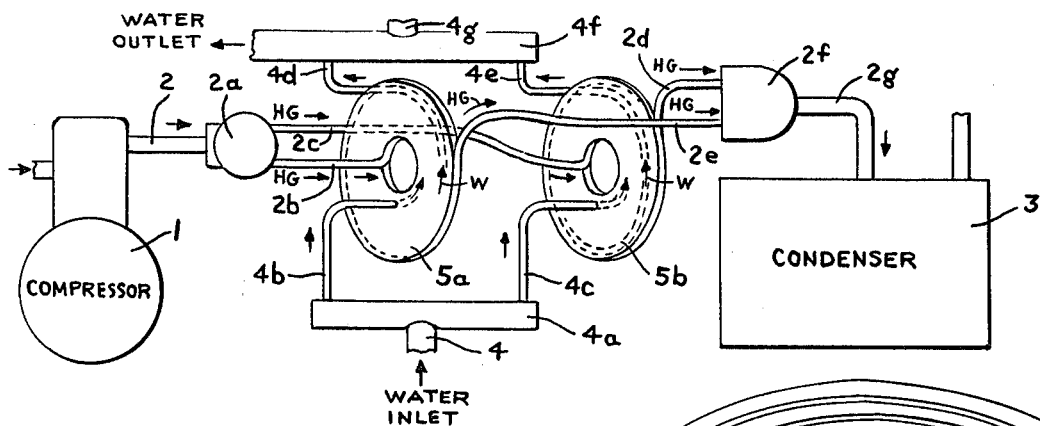
FIG. 1 is a diagrammatic sketch of a portion of a refrigerant circuit or system having a desuperheater therein for passing potable water therethrough to reclaim or recover waste heat from said refrigerant circuit.

Referring to the drawings FIG. 1 shows a diagrammatic sketch of a refrigerant to liquid circuit or system having a refrigerant compressor 1 which discharges hot compressed refrigerant gas through line 2 to a condenser 3.

Disposed in line 2 between the compressor 1 and condenser 3 are at least one or more desuperheater type heat exchangers generally designated 5a and 5b which function, as hereinafter described to permit potable water to pass in heat exchange relation with the hot compressed refrigerant gases flowing from the refrigerant compressor 1 to the condenser 3 for reclaiming or recovering waste heat contained in such hot compressed refrigerant gases and to thereby improve or increase the efficiency of the condenser 3.

Figure 2:
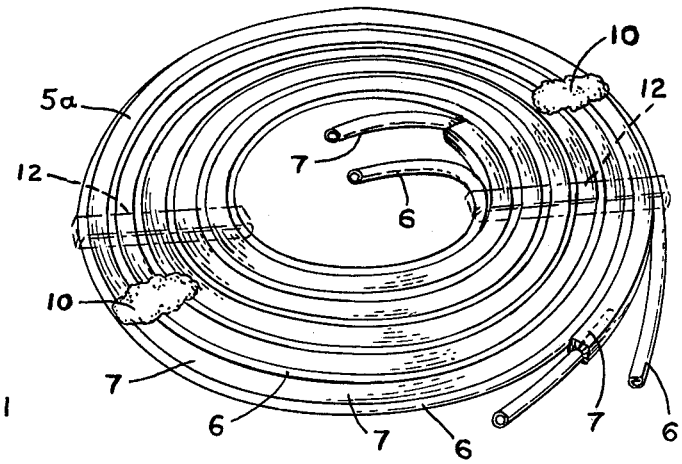
FIG. 2 is an enlarged perspective view of one of the desuperheaters shown in FIG. 1 having a double wall tube assembly in accordance with the present invention.
Figure 3:
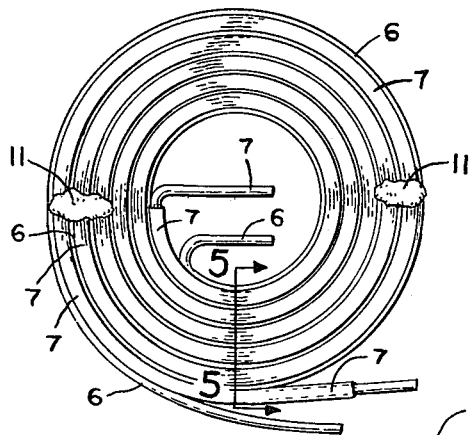
FIG. 3 is a front view of the desuperheater shown in FIG. 2.
Figure 4:
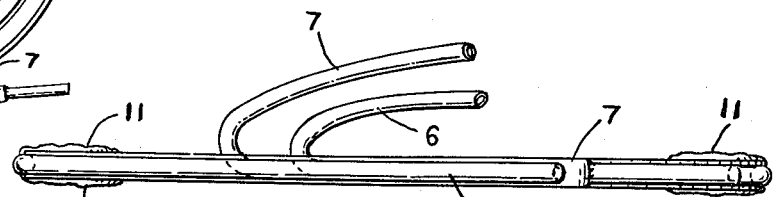
FIG. 4 is an end view of the desuperheater shown in FIG. 2.

Desuperheaters 5a and 5b are illustrated identical in combination and as generally circular members as is shown in FIGS. 1 and 2 of the drawings. It will be understood by those skilled in the art that the desuperheaters 5a and 5b can take any other form in which double walled tube assemblies in accordance with the present invention as hereinafter more fully described can be utilized.

The hot compressed refrigerant gas is delivered through line 2 to a hot compressed refrigerant gas inlet manifold 2a which in turn passes the hot compressed refrigerant gas through connecting pipes as at 2b and 2c which connect to the inlet end of the respective first or outer tubes 6 on each of the desuperheaters 5a and 5b. The hot refrigerant gas will pass through the first or outer tube 6 to the respective outlet end of the desuperheater 5a and 5b and through connecting pipes 2d and 2e to the hot compressed gas outlet manifold 2f.

From the hot compressed gas outlet manifold 2f the hot compressed refrigerant gas passes through the line 2g to the condenser 3.

The potable water enters from any suitable source not shown through inlet 4 to a water inlet manifold 4a and is delivered from the manifold through lines 4b and 4c to the respective inlet ends of the second or inner tubes 7 of the desuperheaters 5a and 5b. As the water passes through the second or inner tube 7 it absorbs heat by conduction through the respective walls of the second or inner tube 7 and the respective walls of the first or outer tube 6 of the desuperheaters 5a and 5b. The water is discharged from the outlet ends of the second or inner tube 7 through connecting lines 4d and 4e to a water outlet manifold 4f and then through the outlet 4g for said water outlet manifold to any desired point of use all of which is shown in FIG. 1 of the drawings.

Referring further to FIGS. 2 to 6 of the drawings the first or outer tube 6 may be any type of conventional standard stock tubing made of copper or steel alloy of which there are several purchaseable on the open market adapted for use in non-contacting heat exchangers.

The second or inner tube 7 for carrying the potable water is a similar standard stock tube in either copper alloy or steel alloy which differs however from the first or outer tube 6 in that it must be shaped for initial close engagement with outer tube 6 and thereafter assembled in as intimate engagement therewith as possible so as to optimize the heat exchange efficiency of the heat conductive path for heat flowing from the hot compressed refrigerant gases through the respective walls of the first or outer tube 6 and second or inner tube 7 to the potable water passing through said second or inner tube 7.

In shaping the second or inner tube 7 it is desirable and preferable to select a shape which will provide flow characteristics for the potable water passing through the second or inner tube 7 to also increase heat exchange efficiency at the inner surface of the coacting wall of the second or inner tube 7 in contact with the associated wall of the first or outer tube 6.

Figure 5:
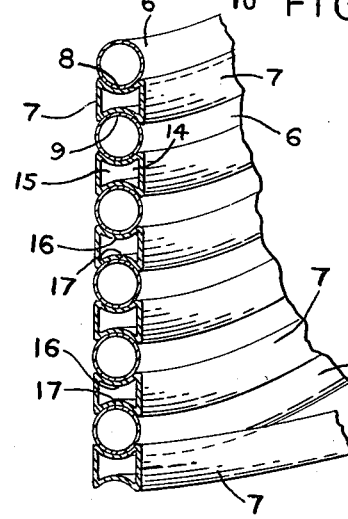
FIG. 5 is a cross-section taken on line 5—5 of FIG. 3.
Figures 6, 7:
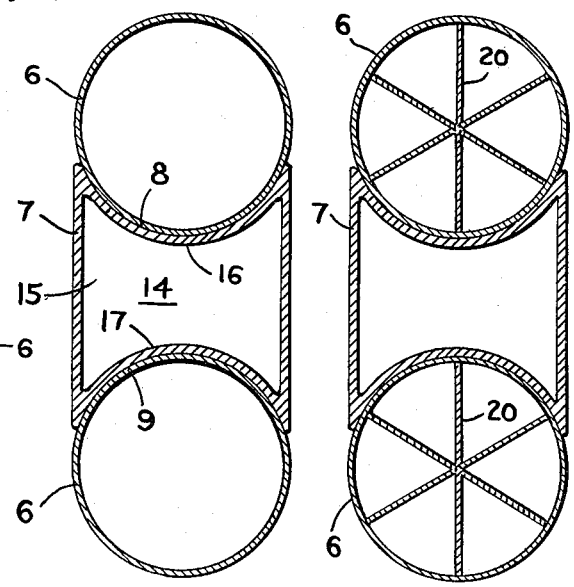
FIG. 6 is an enlarged cross-sectional view of the shaped and contoured tubular member of the form of double wall tube assembly shown in FIGS. 2 to 5 of the drawings.
FIG. 7 is an enlarged cross-sectional view of the shaped and contoured tubular member of another form of double wall tube assembly in accordance with the invention.

To accomplish this the second or inner tube 7 is passed through rolling equipment to establish on two opposing sides or faces thereof generally at 180° to each other concave or inwardly curved indented surfaces having an arcuate shape on the respective external surfaces as at 8 and adapted to match and mate with the curvature of the first or outer tubular member as is shown in FIGS. 5 and 6 of the drawings.

This construction permits the first or outer tubular member 6 and the second or inner tubular member 7 to be brought into close juxtaposition with each other and then the dual walled tubular assembly can be formed into the desired heat exchange shape as for example that shown by the desuperheater 5a wherein a dual wall tube assembly has been rolled and nested into a series of coils with the first or outer tube 6 in engagement with the respective opposite outer sides or faces 8 and 9 of the second or inner tube 7 to provide a substantially planar and circular shape for the desuperheater 5a as illustrated in FIGS. 1 to 4 of the drawings.

In this or any other arrangement where the tube carrying the potable water is in contact on opposite sides with the tube carrying the hot compressed refrigerant gas, double the surface area per unit of cross-sectional area will be obtained to thus increase the heat transfer capability of the desuperheater during the operation thereof.

Further where the heat exchanger is maintained in substantially planar form if a leak develops either in the tube carrying the hot compressed with refrigerant gas or in the tube carrying the potable water such leak will become immediately apparent because it has a relatively short distance to travel to reach the outer and visable surface of the heat exchanger.

In order to insure close and intimate contact of the first or outer tubular member 6 and the second or inner tubular member 7 and to prevent the members from separating the outer coils of the desuperheater 5 are welded to each other as at 10 and 11.

Alternatively the units can be held together by suitable straps 12 as shown by the phantomized lines on FIG. 2 of the drawings.

In FIGS. 5 and 6 the cross-sectional areas of the second or inner tubular member 7 show that the concave or indented portions of the second or inner tubular member produce a narrowed section as at 14 in the fluid flow passage therethrough. This narrowed section is beneficial to the overall heat exchange efficiency of the tube assembly in that the velocity of the fluid flowing through the fluid passage generally designated 15 of the second or inner tubular member is increased along the inner walls as at 16 and 17 where heat exchange is occurring.

Such increased velocity will act to enhance heat exchange because it reduces the boundary layer normally formed adjacent the inner wall of a tubular member in which such fluid flow occurs. It is well recognized by those skilled in the art that in the normal flow of fluid due to the friction between the fluid and the inner wall of the member defining the flow passage for the fluid that a boundry layer of stagnant fluid can and does occur. This layer insulates or interferes with normal heat exchange which occurs through the wall of the given member defining the flow passage. One method of overcoming the formation of such boundary layers of fluid is to increase velocity of the fluid flowing therethrough. In the present invention this advantageously occurs by reason of the indentations established on at least one and preferably on opposing sides of the second or inner tubular member 7.

It has also been found that intimate contact between the coacting outer surfaces of the first or outer tubular member 6 and the second or inner tubular member 7 can be further established by applying high pressure fluid to the second or inner tube 7 so as to squeeze out any air or voids of any type which may exist between the coacting outer surfaces 8 and 9 of the second or inner tubular member 7 with the associate outer surface of the first or outer tubular member 6.

FIG. 7 shows another form of tubular assembly which is substantially similar to the tubular assembly as above described except that the first or outer tubular assembly is provided with an extruded metal star shaped element generally designated 20 which lies in the longitudinal axis of the first or outer tubular member 6 throughout the length thereof. The use of such elongated star shaped elements along the length of a heat exchange tube for the purposes of increasing the amount of conductive heat surface is a well known expedient which will be understood by those skilled in the art. The use thereof in a tubular assembly in accordance with the present invention will increase the heat exchange capacity thereof and thus the efficiency of a heat exchanger formed from such assemblies.

OPERATION

In operation the desuperheaters 5a and 5b recover waste heat by passing the hot compressed refrigerant gases in heat exchange relation with the potable water as above described. The potable water is heated through the double wall formed by the respective fluid flow passages in the first or inner tube 6 and the second or outer tube 7, and the heated potable water passes through the outlet 4g for the system to the desired point of use.

Thus an improved high efficiency double wall tube assembly for refrigerant-to-liquid heat exchangers is provided which meets the statutes and local code requirements for this type of apparatus.

It will be understood that the invention is not to be limited to the specific construction or arrangement of parts shown but that they may be widely modified within the invention defined by the claims.

What is claimed is:

1. A dual wall tube to tube assembly for wound heat exchangers comprising,
   a. a first tubular member made from standard stock tubing from the group of copper and steel alloys having a substantially constant outer diameter along the length thereof,
   b. said first tubular member having first heat conductive wall means defining a first fluid flow passage therethrough, a first inlet for a first heated fluid, and a first outlet for said heated fluid,
   c. a second tubular member also made from standard stock tubing from the group of copper and steel alloys,
   d. said second tubular member having second heat conductive wall means defining a second fluid flow passage therethrough, a second inlet for a second fluid to be heated, and a second outlet for said second fluid,
   e. said second tubular member having a first indented section parallel to the axis of the longitudinal length of said second wall means uniformly shaped and sized on the outer face thereof with a curvature substantially equal to that of the outer diameter of said first tubular member to permit the first wall means of said first tubular member to be formed and forced into matching and direct physical mating engagement with the first indented section in the second wall means of said second tubular member, so as to minimize any air gaps between said first wall means and said first indented section,
   f. said second tubular member having at least a second indented section parallel to the axis of the length of said second wall means spaced a predetermined circumferential distance from said first indented section and also uniformly shaped and sized on the outer face thereof with a curvature substantially equal to that of the outer diameter of said first tubular member to permit the first wall means of said first tubular member to also be formed and forced into matching and direct physical mating engagement with the second indented section in the second wall means of said second tubular member so as to further minimize air gaps between said first wall means and said first indented section and the first wall means and the second indented section whereby said first tubular member and said second tubular member provide intimate, efficient and operative direct heat conductive contact on each of said respective indented faces,
   g. said uniformly shaped and sized first and second indented sections on the second wall means forming along the longitudinal length of the second fluid flow passage in said second tubular member a uniformly restricted portion along the inner wall defining the second fluid flow passage to increase the velocity of the fluid flowing through said second fluid flow passage along the inner wall of said second wall means adjacent the surface of operative direct heat conductive contact of said second wall means with the first wall means of the first tubular member, and
   h. means for maintaining said first and second tubular members in interfitting contact one with the other along the radial extent thereof.

2. In a dual wall tube assembly as claimed in claim 1 wherein said first tubular member and said second tubular member are formed into a plurality of coil sections substantially concentric to each other to define a heat exchanger having the first tubular member on the inner side of each respective coil section and the second tubular member on the outer side of each respective coil section.

3. In a heat exchanger for reclaiming heat from a refrigeration cycle including, a plurality of dual wall tube assemblies as claimed in claim 2 and wherein the plurality of dual walled coil sections are in a substantially single plane.

4. In a refrigerant system including, a compressor having a discharge outlet for hot compressed refrigerant gas, a condenser, and a line connected between said discharge of the compressor and to said condenser for delivering hot compressed refrigerant gas from said compressor to said condenser, the combination therewith of;
   a. at least one wound heat exchanger having a first tubular member with a first line connected to said line to receive hot compressed refrigerant gas from said refrigeration cycle, and a first outlet connected to said line downstream from said inlet connection to return the compressed refrigerant gas to said line,
   b. said heat exchanger including, a second tubular member, c. said first tubular member made from standard stock tubing from the group of copper and steel alloys having a substantially constant outer diameter along the length thereof,
d. said first tubular member having first heat conductive wall means defining a first fluid flow passage therethrough for the hot compressed refrigerant gas,
e. said second tubular member also made from standard stock tubing from the group of copper and steel alloys,
f. said second tubular member having second heat conductive wall means defining a second fluid flow passage therethrough, a second inlet for a second fluid to be heated, and a second outlet for said second fluid,
g. said second tubular member having a first indented section parallel to the axis of the longitudinal length of said second wall means uniformly shaped and sized on the outer face thereof with a curvature substantially equal to that of the outer diameter of said first tubular member to permit the first wall means of said first tubular member to be formed and forced into matching and direct physical mating engagement with the first indented section in the second wall means of said second tubular member, so as to minimize any air gaps between said first wall means and said first indented section,
h. said second tubular member having at least a second indented section parallel to the axis of the length of said second wall means spaced a predetermined circumferential distance from said first indented section and also uniformly shaped and sized on the outer face thereof with a curvature substantially equal to that of the outer diameter of said first tubular member to permit the first wall means of said first tubular member to also be formed and forced into matching and direct physical mating engagement with the second indented section in the second wall means of said second tubular member so as to further minimize air gaps between said first wall means and said first indented section and between the first wall means and the second indented section whereby said first tubular member and said second tubular member provide intimate efficient, and direct operative heat conductive contact on each of said respective indented faces,
i. said uniformly shaped and sized first and second indented sections on the second wall means forming along the longitudinal length of the second fluid flow passage in said second tubular member uniformly restricted portion along the inner wall defining the second fluid flow passage to increase the velocity of the fluid flowing through said second fluid flow passage along the inner wall of said second wall means adjacent the surface of operative direct heat conductive contact of said second wall means with the first wall means of the first tubular member, and
j. means for maintaining said first and second tubular members in interfitting contact one with the other along the radial extent thereof.

* * * * *